UNITED STATES PATENT OFFICE.

LOUIS P. ANGENARD, OF NEW YORK, N. Y.

IMPROVED SOLUTION FOR GILDING CHINA, GLASS, AND OTHER WARES.

Specification forming part of Letters Patent No. 43,080, dated June 14, 1864.

*To all whom it may concern:*

Be it known that I, LOUIS P. ANGENARD, of New York city, county and State of New York, have invented a new and Improved Mode of Gilding without Burnish or Brilliant Gold; and I do hereby declare that the following is a full and exact description thereof, reference being had to the accompanying sample.

The nature of my invention consists in the mode of preparing gold and chemical solutions and its applications.

To enable others skilled in the art to make and use my invention, I will proceed to describe my process and the manner to apply it to the gilding of china, Dutch ware, glassware, and other potteries.

First solution: pure gold, five drams; nitric acid, one ounce; muriatic acid, three ounces; pure tin, one scruple; butter of antimony, one scruple; distilled water, one pint. Dissolve in a vase of porcelain with a mild heat.

Second solution: pure turpentine of Venice, three drams; pure oil of turpentine, three ounces; oil of lavender, two ounces; flour of sulphur, three drams. Dissolve in another vase with the same heat as the first solution.

Third solution: pure oil of turpentine, four ounces; oil of lavender, six drams; nitrate of bismuth crystallized, one dram; yellow oxide of bismuth, two and one-fourth ounces.

Break into powder in a mortar of porcelain and mix the three solutions together in agitating the whole strongly several times during about an hour. After twelve hours' rest it is decanted and preserved for usage.

The gilding of this specimen is obtained in putting the above-described liquid on the porcelain, glass, Dutch ware, and other potteries. Afterward the objects are submitted to the fire of the muffle and to the following temperature: First, for the porcelain the fire must be red white; second, for the Dutch ware the fire must be cherry red; third, for the glassware the fire must be dark red.

What I claim for my invention, and desire to secure by Letters Patent, is—

The chemical proportion and preparation of the solution and its application to china, Dutch ware, glassware, and other potteries, as described in the above.

New York, March 28. 1864.

LOUIS P. ANGENARD.

Witnesses:
   VATEL,
   D. E. COUTARET.